(12) United States Patent
Hammon et al.

(10) Patent No.: US 7,006,877 B2
(45) Date of Patent: Feb. 28, 2006

(54) METHOD FOR AUTOMATICALLY RECORDING AN INTERVENTION IN A PRODUCTION FACILITY

(75) Inventors: Harald Hammon, Nuremberg (DE); Werner Hoefler, Eckental (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/922,983

(22) Filed: Aug. 23, 2004

(65) Prior Publication Data

US 2005/0113956 A1 May 26, 2005

Related U.S. Application Data

(63) Continuation of application No. PCT/DE03/00554, filed on Feb. 21, 2003.

(30) Foreign Application Priority Data

Feb. 22, 2002 (DE) .............................. 102 07 526

(51) Int. Cl.
*G06B 19/00* (2006.01)
(52) U.S. Cl. .................... 700/19; 700/11; 700/108; 700/109; 700/110; 700/169
(58) Field of Classification Search ................. 700/11, 700/12, 19, 108, 109, 110, 169; 702/84, 702/187
See application file for complete search history.

(56) References Cited

U.S. PATENT DOCUMENTS

| 4,251,858 A | 2/1981 | Cambigue et al. |
| 5,093,772 A * | 3/1992 | Senda et al. .................. 700/19 |
| 6,105,520 A * | 8/2000 | Frazer et al. ............... 112/117 |
| 6,295,478 B1 * | 9/2001 | Inada .......................... 700/51 |
| 6,381,512 B1 * | 4/2002 | Saitou et al. ............... 700/200 |
| 6,487,462 B1 | 11/2002 | Reeves |
| 6,871,104 B1 * | 3/2005 | Lenhart et al. ............... 700/18 |
| 2002/0072809 A1 * | 6/2002 | Zuraw ........................... 700/9 |
| 2003/0171827 A1 * | 9/2003 | Keyes et al. .................. 700/19 |
| 2004/0088065 A1 * | 5/2004 | Robitaille et al. ............ 700/95 |
| 2004/0267395 A1 * | 12/2004 | Discenzo et al. ............. 700/99 |

FOREIGN PATENT DOCUMENTS

DE 196 14 748 A1 10/1997

* cited by examiner

*Primary Examiner*—Albert W. Paladini
*Assistant Examiner*—Douglas S. Lee
(74) *Attorney, Agent, or Firm*—Sughrue Mion, PLLC

(57) ABSTRACT

A method and a system for automatically recording an intervention in a production facility (1) controlled by a control program (14). The production facility (1) includes a number of facility components (3, 4, 5, 6, 7, 8, 9a–9e). According to the method and the system, information about a status of the facility component(s) (3–5, 6–8, 9a–9e) and information on whether this status exists in accordance with the control program (14) is retrieved from the control program (14, 15) and is recorded if this status does not exist according to the control program.

24 Claims, 2 Drawing Sheets

1. Production Facility
2. Automation System
3. First Container
4. Reactor
5. Second Container
6, 7, and 8. Lines
6', 6'', 7', 7'', 8', and 8'' - front & rear openings
9a-9e. Valves
10. Controller
11. Input Means
12. Output Means
13. Memory
14. Control Program
15. Data
16. Input Memory of the Data
17. Output Memory of the Data 1. Production Facility
2. Automation System
3. First Container
4. Reactor
5. Second Container
6, 7, and 8. Lines
6', 6'', 7', 7'', 8', and 8'' - front & rear openings
9a-9e. Valves
10. Controller
11. Input Means
12. Output Means
13. Memory
14. Control Program
15. Data
16. Input Memory of the Data
17. Output Memory of the Data 20. Central Mechanism
21. Planning Tool
22. Automation Tool
23. First Function Component
24. Second Function Component
25. Consistency Check
26. Third Function Component
27. Fourth Function Component
28. Rule Evaluator
29. Rule Database
30. Main Modification Log
31. Fifth Function Component

METHOD FOR AUTOMATICALLY RECORDING AN INTERVENTION IN A PRODUCTION FACILITY

This is a Continuation of International Application PCT/DE03/00554, with an international filing date of Feb. 21, 2003, which was published under PCT Article 21(2) in German, and the disclosure of which is incorporated into this application by reference.

FIELD AND BACKGROUND OF THE INVENTION

1. Field of the Invention

The present invention relates to a method for automatically recording an intervention in a production facility that is controlled by a control program and has a plurality of facility components.

2. Description of Related Art

A method for automatically recording an intervention in a production facility. An intervention in the production facility is, for example, a change in the operating mode under which the control program controls the production facility. A control program usually includes at least two distinct operating modes, i.e., an automatic mode and a manual mode. In addition to these two modes, a so-called setup mode may be provided. In the setup mode, the automatic processes are activated in part, and manual interventions, not allowed in the automatic mode, are possible. Switching between automatic mode and manual mode is an intervention in the production facility, which is often recorded and logged, e.g., to obtain an overview of the down times of the production facility. In addition, this or a similar intervention may also be recorded to detect any unauthorized operations or interventions in the production facility, e.g., in food processing.

Until now, such recording have always related to a control system of the production facility and thus only indirectly to the production facility itself. For example, actuating a control element, e.g., a switch to switch between manual and automatic mode, initially affects the control program and its operating mode. Recording such an intervention is possible primarily because the control element is part of the control system and is therefore monitored by the control program in any event. Since each actuation of the control element influences the behavior of the control program, it is easy to detect and record such interventions.

Conventional systems, however, are unable to detect automatic interventions in the production facility itself. Therefore, the conventional automatically generated records on the operational situation of a production facility are incomplete.

OBJECTS OF THE INVENTION

Thus, the object of the present invention is to provide a method with which previously unnoticed or hidden interventions in the production facility are now automatically detected.

Illustrative, non-limiting embodiments of the present invention may overcome the above disadvantages and other disadvantages not described above. The present invention is not necessarily required to overcome any of the disadvantages described above, and the illustrative, non-limiting embodiments of the present invention may not overcome any of the problems described above. The appended claims should be consulted to ascertain the true scope of the invention.

SUMMARY OF THE INVENTION

According to exemplary, non-limiting embodiments of the present invention, a method and a system for automatically recording an intervention in a production facility with a number of facility components, which is controlled by a control program, is provided. The control program is configured to control the statuses of the facility components. In this method, information on a respective status of at least one facility component is retrieved from the control program and additional information relating to existence or occurrence of the respective status of one or more facility component according to the control program is also retrieved. If the respective status of one or more facility components does not exist according to the control program, the information regarding the respective status is recorded.

The system according to the exemplary, non-limiting embodiment of the present invention, has a central mechanism and a log. The central mechanism retrieves from the control program, information on a respective status of one or more facility components and additional information relating to existence of the respective status of one or more facility components according to the control program. When the respective status of one or more facility components does not exist according to the control program, information regarding the respective status is recorded into the log.

In the illustrative, non-limiting embodiments, the term control program means both complete set of instructions that define the program flow, e.g., jump to or transfer subroutines, etc., and the data used, particularly the so-called process image. Furthermore, a spatially or functionally limited part of the facility is referred to as a facility part, and each facility part and the connecting elements, e.g., a pipeline as well as motors, valves, etc., or a combination thereof, are referred to as facility components.

In a production facility, particularly a processing facility, e.g., a facility for pharmaceutical products or fine chemicals, a refinery or a food processing plant and so on, an operator must demonstrate to an inspection authority that a certain production process consistently produces a product that satisfies predefined specifications and quality characteristics. This requirement applies not only when the facility is first built but also during ongoing operations. All interventions in the production facility must therefore be recorded.

In the conventional systems and methods, this task is accomplished by means of a so-called main modification log. This log must show, at any time, who (operator) has modified what (facility component) when (date/time) in the production facility. Conventionally, such a log is kept manually. As a result, the person who is responsible enters modifications made in the production facility in the main modification log, e.g., based on the memory of the respective operator, based on concrete instructions to an operator, e.g., to replace a certain facility component, and based on logs regarding the operational status of the production facility. This is time-consuming and error-prone. To minimize time and effort, interventions are made on a very limited basis. This, however, affects flexibility and/or efficiency of the production facility. Often, new findings are not incorporated in the production facility or in the production process because of the hassle with the manual modification log.

In addition, an inspector or inspection authority can rely on this manual modification log only to a limited extent, since manipulations in the form of changes, omissions and additions cannot be excluded and are not readily apparent. As a result, an inspection of the production facility by the inspection authority often involves a significant amount of time and effort because detailed inspections of the entire production facility are conducted irrespective of the content of the manual main modification log.

According to the exemplary, non-limiting embodiment of the present invention, the control actions in the production facility are unambiguously traced to modifications in the production facility, so that the respective modification in the production facility can be detected. This enables a comprehensive documentation of the operational status of the production facility.

If the status and/or the facility component involved are recorded, an equivalent of the current main modification log can be automatically generated. The facility component involved is determined according to a predefinable or predefined rule, which may be stored in a database.

If a confirmation by the respective operator is required for recording an entry into the log, it is subsequently possible to reconstruct who was working at the production facility when the respective status was detected or recorded. This can be useful if additional information is subsequently required to manually supplement the collected data. It is also possible to reconstruct at any time whether a performed intervention was carried out by an authorized personnel. This is useful, for example, to be able to document that competent personnel carried out a given intervention.

If an operator's authentication that can be electronically evaluated is required for the confirmation by the operator, a "security chain" in the fully automatic generation of the main modification log is complete. On the one hand, interventions in the production facility are automatically detected and a respective entry in the equivalent of the main modification log is automatically generated. On the other hand, based on an operator authentication that can be electronically evaluated, an associated entry is automatically generated, which shows who was working at the production facility when the intervention was detected or recorded. The two entries cannot be changed without the change being apparent. This ensures an unbroken documentation of the events in the production facility.

Thus, the electronic main modification log that shows interventions in the production facility can be given to the inspection authority. Such an automatically generated document can be unlawfully falsified only with considerable efforts. As a result, the inspection authority may accept a document that has obviously not been falsified, so that the scope of the regular inspections is substantially reduced and the inspections are thereby accelerated.

If, particularly in a continuous production process, at least one product is produced from at least one starting material, and to produce that product, each starting material is transported through one or more lines, each having a front and rear node configured to be opened and closed such that each line meets another line at one of the nodes, the production facility is primarily formed by a network of lines. The lines interconnect individual facility parts as the facility components. It is important to detect each intervention in this network, because contaminants can get into the line system, for example, if a node or a connection of two lines is opened. If, furthermore, a line topology contains information about each line, its nodes and connections with other lines, and the control program supplies information as to which node is closed and when, i.e., information about the line through which a starting material was transported and when the starting material was transported, and the control program further supplies information as to whether this closing exists or occurs according to the control program, it is possible to determine which line or lines are involved in an intervention in the production facility.

The line topology—analogous to roads and paths, e.g., for a route-planning program—can be easily represented by graphs, particularly the so-called directional graphs.

The phrase "according to the control program" as used herein refers, in particular, to the automatic operation of the control program. In other words, closings that occur or exist in accordance with the process that is automatically controlled by the control program are not taken into account, while closings that are not caused by the momentary status of the production process are. This distinction is necessary because even the latter type of closings can also occur under the control of the control program, e.g., when a facility part is switched to a setup mode and the actuation of the respective control elements brings about the respective closings. Such interventions, e.g., the closing of a line, are hereinafter referred to as "unexpected" interventions.

Advantageously, an unexpected closing, e.g., a closing brought about manually or not according to the control program of two or more nodes is evaluated and respectively recorded as a replacement of each line located between the nodes.

The unexpected closing of two nodes is a condition specified by a rule, which is composed of a condition and a result. The associated result with this condition of unexpected closing is that a replacement of each line lying between the nodes has been performed.

Advantageously, an unexpected deactivation of a facility part, to which each closed node and/or each line therebetween belongs, is recorded and, in particular, is evaluated and/or recorded as a replacement of each respective line.

A deactivation, particularly an unexpected deactivation of a facility part that occurred with respect to the production process, expands the condition of the above-described rule. Thus, the rule is, for example, "if two nodes are (unexpectedly) closed and the facility part in which these nodes are located was (unexpectedly) deactivated, then this is evaluated as a replacement of each lines extending between the nodes."

Advantageously, interventions with respect to the conveying means, e.g., motors, which are provided to move a starting material within a line, can be detected. For this purpose it is provided that, if a conveying means is combined with one or more lines and if two nodes that include the line with the conveying means are unexpectedly closed, then this is evaluated and/or respectively recorded as a replacement of the conveying means and/or the line that is combined with the conveying means.

Advantageously, if a cleaning can be prompted for one or more line, an unexpected cleaning of a line is evaluated and/or respectively recorded as a previously performed replacement of the line. This corresponds to an additional rule, which is, for example: "If an (unexpected) cleaning of a facility component, a line or a line segment occurs, then this is evaluated as a replacement of the facility component affected by the cleaning."

Respectively, if a pressure test can be prompted for one or more lines, an unexpected pressure test of a line is evaluated and/or respectively recorded as a previously performed replacement of one or more lines. The unexpected pressure test also corresponds to an additional rule, which is, for example: "If a pressure test of a facility component, a line or a line segment occurs (unexpectedly), then this is evaluated as a replacement of the facility component affected by the pressure test."

Finally, each condition of a rule can be linked to an error or maintenance message, such that the recording occurs only if prior to that, i.e., prior to the unexpected intervention, an error or maintenance message was triggered. A combination of the presence of an error or maintenance message and, for example, one of the above-described conditions is meaningful because interventions in the production facility, particularly authorized interventions in the production facility, are normally preceded by an exceptional situation, which is indicated to the operator personnel by an error or warning message or a maintenance message. With the intervention in the production facility, the operator personnel attempt to correct the exceptional situation, so that the production process can be continued. According to the exemplary, non-limiting embodiment of the present invention, the required interventions are detected and recorded.

BRIEF DESCRIPTION OF THE DRAWINGS

The present invention will now be described in detail by describing an illustrative, non-limiting embodiment thereof with reference to the accompanying drawings. In the drawings, the same reference characters denote the same elements.

DETAILED DESCRIPTION OF THE PREFERRED EMBODIMENTS

Figure 1:
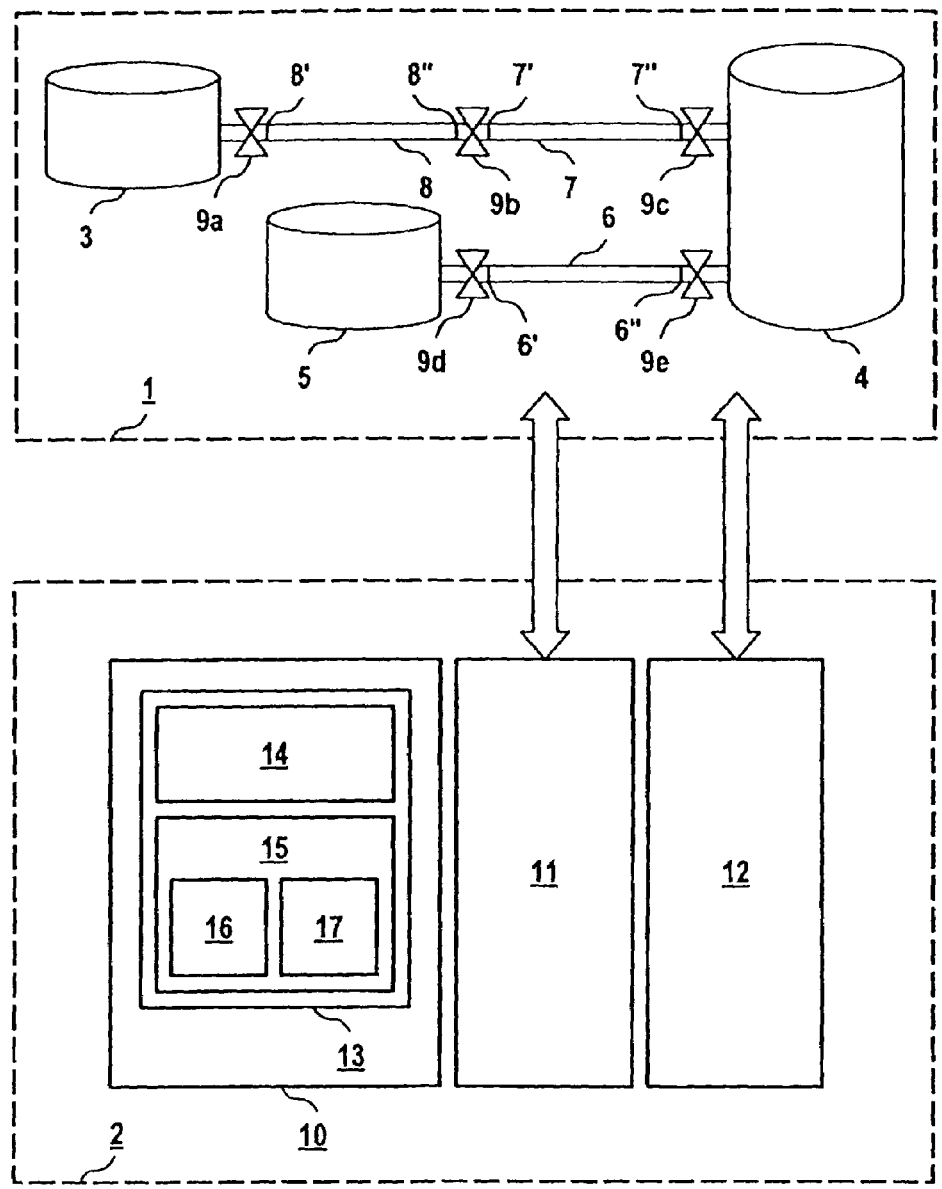
FIG. 1 shows a production facility with an automation system in accordance with illustrative, non-limiting embodiment of the present invention.

FIG. 1 shows a simplified production facility 1 and a block diagram of an automation system 2. The production facility 1 includes a first container 3, e.g., for a starting material, a reactor 4 and a second container 5, e.g., for an end product. The two containers 3 and 5 and the reactor 4 are referred to as the facility parts for linguistic convenience only. Each facility part is connected to another facility part by one or more lines 6, 7, 8. These lines can be pipelines. Each line has a front and a rear opening. For example, line 6 has a front opening 6' and a rear opening 6". Similarly, line 7 has openings 7' and 7" and line 8 has openings 8' and 8". Hereinafter these openings are referred to as nodes for linguistic simplicity only. At each node, a line can be connected to another line or a facility part. For example, as illustrated in FIG. 1, the first container 3 has a front opening 8', a rear opening 8", and a line 8. The rear opening 8" connects container 3 to the front opening 7' of the reactor 4.

To isolate the lines 6–8, valves 9a, 9b, 9c, 9d, 9e are provided at each node. For example, as illustrated in FIG. 1, valve 9a is provided at a front opening 8', 9b between the rear opening 8" and the front opening 7', valve 9c is provided at the rear opening 7", valve 9d is provided at the front opening 6' and valve 9e is provided at the rear opening 6". Thereby, lines 6, 7, and 8 are isolated. Facility parts, lines and valves are hereinafter referred to as facility components or simply as components for linguistic simplicity only.

The automation system 2, illustrated in FIG. 1, controls a production process that takes place in the production facility 1. In order to control this production process of the production facility 1, the automation system 2 includes a controller 10, e.g., a so-called stored program controller 10 (SPC), and input and output means 11 and 12, respectively, to output control information to the production facility 1 and to read in status information from the production facility 1 (as illustrated by double arrows in FIG. 1). The controller 10 has a memory 13, which stores a control program 14 to control and/or monitor the production process and data 15 accessed by the control program in order to control and/or monitor the production process. Data 15 may be the so-called process image.

To close the line 6 between the reactor 4 and the second container 5, the two valves 9d and 9e provided on the line 6 must be closed. To close valves 9d and 9e, the control program 14 assigns appropriate output variables. In the data area 15, data are created for these output variables, which in combination represent the current status of the production facility 1. As illustrated in FIG. 1, data 15 has an input memory 15 and an output memory 17. The input memory area 16 and the output memory area 17 together, form the process image. A distinction should be drawn between the two memories. The input memory area 16 includes all the data recorded from the production process. The output memory area 17 includes all the data to be output to the production process. Each controllable component 9a–9e (the valves illustrated in FIG. 1), or each other component of the production facility 1 controlled by the control program 14 has a unique association in the output memory area 17. For example, for a component 9a–9e can assume only two states: open and closed, the component or its status is represented in the output memory area 17 by one bit: high and low. To close the two valves 9d and 9e, the respective bit in the output memory area 17 is occupied (for example, a high bit is occupied for open and a low bit is occupied for closed). The controller 10 cyclically outputs the entire content of the output memory area 17 to the production facility 1. In particular, one or more output means 12 outputs the content of the output memory area 17. A suitable output means 12 is, for example, a digital output module.

When the valves 9d and 9e are triggered (e.g., closed), the line 6 extending between the two valves 9d and 9e is isolated. When the closing of the valves 9d and 9e has been completed, the automation system 2 records this as a status of the production process. Statuses of the process and thus data recorded from the process form the inputs. Each individual status of the process is buffered in a section of the input memory area 16 provided for storing the statuses of the process. A simple status is stored in one bit of a byte of the input memory area 16 provided for this particular status. More complex statuses, e.g., analog measured values (temperature, weight, filling value), are stored in a continuous area of the input memory area 16 provided for these complex statuses, e.g., in one byte, one word, or one long word as opposed to one bit. Referencing of such a position or area of the input memory area 16 is facilitated by a respective variable declaration.

For each valve 9a–9e, two bits can be provided in the input memory area 16. The first bit stores information on whether the valve 9a–9e is opened—yes, no—and the second bit stores information on whether the valve 9a–9e is closed—yes, no. After the closing of the two valves 9d and 9e, this state can be detected by means of the statuses of the respective bits of the input memory area 16.

It is presumed that at no time during automatic control of the production process both valves 9d and 9e are closed. These valves 9d and 9e are used to close the line 6, which interconnects the reactor 4 and the second container 5. Based on this premise that at no time both valves are closed (that is, the line is isolated), at most one of the two valves 9d or 9e is closed at any given time during automatic control of the production process. For example, the valve 9e facing the reactor 4 is closed as long as a controlled reaction takes place in the reactor 4. The valve 9e is opened when the reaction is complete, and the reagent as the end product is transported into the second container 5. The valve 9d facing the second container 5 is closed when the product is inside the container 5. The valve 9d is opened again when the product has been withdrawn from the container 5 and the container 5 is ready to be filled again.

If, for example, the line 6 has become defective and needs to be replaced, both valves 9d and 9e must be closed because substances will otherwise leak from the reactor 4 or the container 5 or, for example, impurities could get into the reactor or the container. The closing of both valves 9d and 9e does not occur in the automatic mode according to the above premise. It is therefore established that as soon as the status "closed" is detected in both valves 9d and 9e, an intervention occurred in the production facility 1.

To detect this intervention, information about a respective status of the production facility 1 and/or a facility part (e.g., container 3, reactor 4, and container 5) is retrieved from the control program 14 and the associated data 15. The system detects, among other things, that both valves 9d and 9e are closed. Information as to whether each determined status exists according to the control program 14 is then retrieved from the control program 14. It is found that according to the control program 14, the two valves 9d and 9e are never closed simultaneously. Thus, at least one status that is unexpected, i.e., does not exist according to the control program 10, has been determined. This is finally recorded.

To improve the information content of such recordings, the system records which facility part 3, 4, or 5 or which facility component 3–5, 6–8, or 9a–9d is affected by this unexpected status. For this purpose, the information of the so-called facility identifiers is accessed. Facility identifiers are commonly used, for example, to distinguish components in a first facility part from those in a second facility part. The syntax and structure of facility identifiers is standardized.

The two unexpectedly closed valves 9d and 9e are identified with the complete identifier, e.g., as follows: "production facility_3rd reactor_1st valve_discharge lock" and "production facility_3rd container_2nd valve_inlet lock." The facility identifiers can be used to determine to which facility part 3, 4, or 5 the components 9d and 9e with the unexpected status belong. In the present example, the first unexpectedly closed valve 9d ("valve_inlet lock") belongs to the facility part 5 "container_2" and to the production facility 1 "production facility_3". The second unexpectedly closed valve 9e ("valve_discharge lock") belongs to the facility part 4 "reactor_1" and likewise to the production facility 1 "production facility_3". This information is used to record which facility part 3, 4, or 5 may be affected by the intervention in the production facility 1.

To further improve the information content of such recordings, the system needs to establish which facility components are affected by the unexpected intervention. Each line 6, 7, and 8 has a front and rear opening, particularly nodes 6'–8' and 6"–8", respectively, configured to be opened and closed. At each node 6'–8'; 6"–8" the line 6, 7, or 8 meets another facility component or another line 6, 7, or 8. Information on the course of each line 6, 7, 8, its interconnections or connections with other facility components, is stored in a line topology. Thus, if it has already been established that the two valves 9d and 9e are unexpectedly closed, the line topology will indicate which facility components are located between these two valves 9d and 9e. In this case, it can be established that the line 6, which interconnects the reactor 4 and the second container 5, is located between the two valves 9d and 9e. Based on the unexpectedly closed valves 9d and 9e, it can be concluded that the intervention in the production facility 1 is related to this line 6. This detailed information is recorded. As a result, it is subsequently possible to document:

a) which unexpected status occurred (the two valves 9d and 9e were closed, although this was not provided according to the control program 14), b) which facility parts are/might be affected by the unexpected status (the respective facility identifier of the two identified valves 9d and 9e shows that the first valve 9e belongs to the facility part with the second container 5 and the second valve 9e belongs to the facility part with the reactor 4), c) and which facility component is specifically affected (the line topology, which contains information on all the lines 6, 7, 8 and their interconnections and connections with facility components, shows that the line 6 between the reactor and the second container 5 is connected to the two valves 9d and 9e; hence it can be determined that line 6 is isolated).

Figure 2:
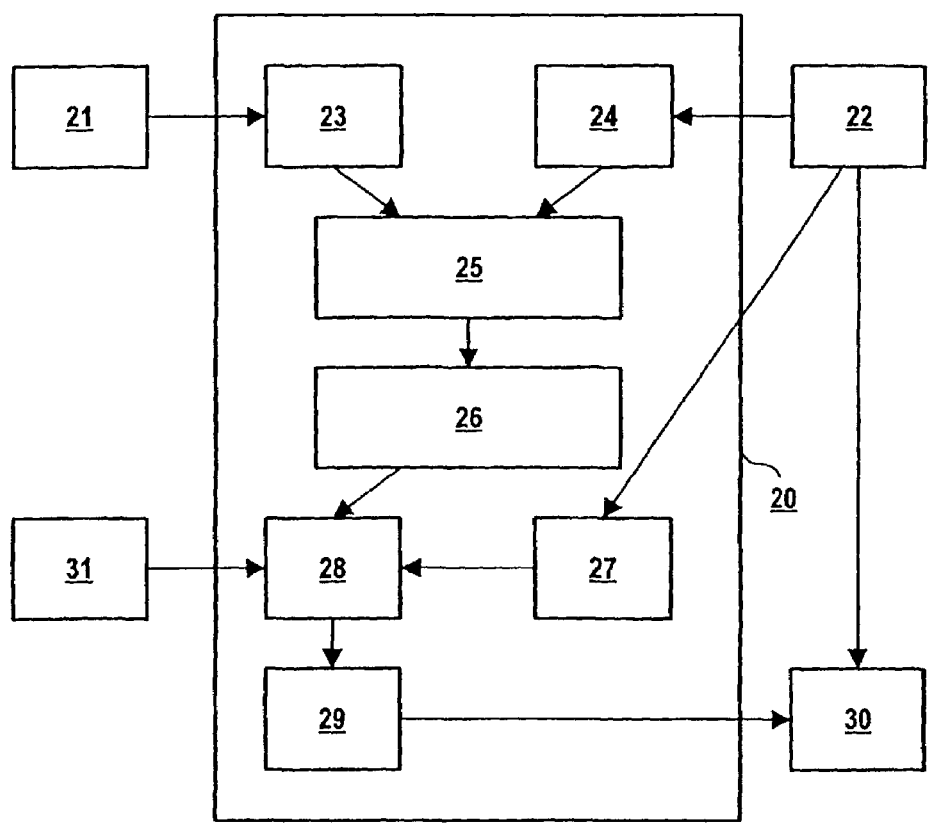
FIG. 2 shows the sequence of the method for automatically recording an intervention in the production facility in accordance with illustrative, non-limiting embodiment of the present invention.

FIG. 2 schematically shows a block diagram to illustrate the sequence of the method for automatically recording interventions in the production facility. A central mechanism 20 for detecting interventions in a production facility 1 (FIG. 1) has data available from a planning tool 21 and an automation tool 22. The planning tool 21 includes, among other things, information on all the facility parts (e.g., facility parts 3–5) and all the facility components (e.g., components 3–5, 6–8, and 9a–9e). The planning tool 21 further includes the line topology with information on all the lines 6–8 and their interconnections or connections to other facility components 3–5, 6–8, and 9a–9e. The automation tool 22 either includes the automation system 2 (FIG. 2) or provides access to the automation system 2.

In a first function component 23, relations between the facility components 3–5, 6–8, and 9a–9e and components of the control unit of the production facility 1 (FIG. 1) are determined. Components of the control unit are the controller 10 and, for example, control elements (not depicted) and facility components 3–5, 6–8, and 9a–9e, e.g., the valves 9a–9e, on which the automation system 2 (FIG. 2) acts directly. The first function component 23 ensures an operation, at least a logic operation between, e.g., the planning data relating to the valves 9a–9e and the data of the automation system 2 relating to the same valves 9a–9e. A second function component 24 is used to read data from the automation tool 22. The data supplied by the first and the second function components 23 and 24 are subjected to a consistency check 25. In this portion of the sequence, an intervention by the user is possible if problems occur during the consistency check 25.

A third function component 26 is used to determine proximity relations among the facility components 3–5, 6–8, and 9a–9e. The third function component 26 is used, for example, to determine which line 6 (FIG. 1) extends between the reactor 4 and the second container 5 and which of the two valves 9d and 9e (FIG. 1) can be used to close this line 6.

A fourth function component 27 is used to detect operations of the production facility 1. The fourth function component 27 provides, for example, process image data 15 that make it possible to detect whether a specific valve 9a–9e is open or closed.

Thus, all the data required to detect an intervention in the production facility 1 are available. The data are supplied to a rule evaluator 28, which accesses predefined stored rules or operator-defined rules and possibly a rule database 29.

One of the rules used by the rule evaluator is, for example: "If two valves are closed unexpectedly (not according to the control program), then this is considered a replacement of each line located between them." The rule can be expanded as follows: "if two valves are closed unexpectedly ( . . . ) and each facility part to which the valves belong, has been switched to manual or setup mode prior to that, then this is considered a replacement of each line located between the valves."

The results of these or similar rules, which can be expanded and modified almost at will for a wide variety of applications, identify the detected interventions in the production facility 1, e.g., "line between reactor and second container replaced; <date>, <time>." These detected interventions are entered in a main modification log 30 in an electronic form. The electronic main modification log 30 is, for example, a text file 30, which is stored on a suitable storage medium, e.g., a hard disk of a control computer (not depicted).

Prior to the acceptance of detected interventions in the main modification log 30, a fifth function component 31 can prompt a confirmation by an operator. To prevent misuse, a user authentication that can be electronically evaluated, may be required for the confirmation by the user. The entry in the main modification log 30 is then supplemented by operator-related data.

Interventions in the control unit of the production facility can be detected directly by means of the data of the automation tool 22. Data relating to such interventions can thus be entered directly in the main modification log 30.

Thus, the intervention can be summarized as follows: A method is proposed for automatically recording an intervention in the production facility 1, which is controlled by a control program 14 and has a plurality of facility components 3, 4, 5, 6, 7, 8, and 9a–9e. Information on a respective status of each facility component 3–5, 6–8, and 9a–9e is retrieved from the control program 14, and process image or data 15. Furthermore, information as to whether this status exists or occurs according to the control program 14 is retrieved from the control program 14. If this status does not exist according to the control program 14, this is evaluated and recorded as an intervention in the production facility. This exemplary method is related to the determination and recording of each facility part 3–5 or each facility component 3–5, 6–8, and 9a–9e to which the intervention relates. This information makes it possible to automatically keep a main modification log 30.

The above description of the illustrative, non-limiting embodiment has been given by way of an example. The above and other features of the invention including various novel method steps and a system of the various novel components have been particularly described with reference to the accompanying drawings and pointed out in the claims. It will be understood that the particular process and construction of parts embodying the invention is shown by way of illustration only and not as a limitation of the invention. The principles and features of this invention may be employed in varied and numerous embodiments without departing from the scope of the invention as defined by the appended claims and equivalents thereof.

What is claimed is:

1. A method for automatically recording an intervention in a production facility, the production facility being controlled by a control program and having a plurality of facility components wherein the control program is configured to control statuses of the facility components, the method comprising:

a) retrieving from the control program information on a respective status of at least one of the facility components;

b) retrieving additional information relating to whether the respective status of the at least one facility component exists according to the control program; and c) if the respective status of the at least one facility component does not exist according to the control program, executing an intervention into the production facility and automatically recording information regarding occurrence of said intervention into an intervention log.

2. The method as claimed in claim 1, wherein the recording requires a confirmation by an operator.

3. The method as claimed in claim 2, wherein an authentication of the operator that can be electronically evaluated is required for the confirmation by the operator.

4. The method as claimed in claim 1, wherein at least one respective status and the facility component affected by the respective status, is determined according to a predefined rule, and the determined at least one respective status and the affected facility is recorded.

5. The method as claimed in claim 4, wherein the recording requires a confirmation by an operator.

6. The method as claimed in claim 5, wherein an authentication of the operator that can be electronically evaluated is required for the confirmation by the operator.

7. A method for automatically recording an intervention in a production facility, the production facility being controlled by a control program and having a plurality of facility components wherein the control program is configured to control statuses of the facility components, the method comprising:

a) retrieving from the control program information on a respective status of at least one of the facility components;

b) retrieving additional information relating to whether the respective status of the at least one facility component exists according to the control program; and c) if the respective status of the at least one facility component does not exist according to the control program, recording information regarding the respective status, wherein in a production process, at least one product is produced from at least one starting material, to produce the product, the at least one starting material is transported through at least one line, the at least one line having front and rear nodes configured to be opened and closed, the at least one line meets at least one other of the facility components at one of the nodes, a line topology contains information on the at least one line and connections of the at least one line with the at least one other facility component, information specifying when and which node is closed, is retrieved from the control program, and further information relating to whether the retrieved closing exists according to the control program is retrieved from the control program.

8. The method according to claim 7, wherein the production process is a continuous production process.

9. The method as claimed in claim 7, wherein a conveying means is combined with the at least one line, and wherein an unexpected closing of two nodes that include the at least one line with the conveying means, is evaluated and recorded as a replacement of at least one of the conveying means and the line combined with the conveying means.

10. The method as claimed in claim 7, wherein a cleaning is prompted for the at least one line, and wherein an unexpected cleaning of the at least one line is evaluated and recorded as a previously performed replacement of the at least one line.

11. The method as claimed in claim 7, wherein a pressure test can be prompted for the at least one line, and wherein an unexpected pressure test of the at least one line is evaluated and recorded as a previously performed replacement of the at least one line.

12. The method as claimed in claim 7, wherein an unexpected closing of at least two nodes from the nodes is evaluated and recorded as a replacement of the at least one line located therebetween.

13. The method as claimed in claim 12, wherein a conveying means is combined with the at least one line, and wherein an unexpected closing of two nodes that include the at least one line with the conveying means, is evaluated and recorded as a replacement of at least one of the conveying means and the line combined with the conveying means.

14. The method as claimed in claim 12, wherein a cleaning is prompted for the at least one line, and wherein an unexpected cleaning of the at least one line is evaluated and recorded as a previously performed replacement of the at least one line.

15. The method as claimed in claim 12, wherein a pressure test is prompted for the at least one line, and wherein an unexpected pressure test of the at least one line is evaluated and recorded as a previously performed replacement of the at least one line.

16. The method as claimed in claims 12, wherein the recording takes place only if at least one of an error or maintenance message was previously triggered.

17. The method as claimed in claim 12, wherein an unexpected deactivation of a facility part, to which at least one closed node or the at least one line located therebetween belongs, is recorded.

18. The method as claimed in claim 17, wherein a conveying means is combined with the at least one line, and wherein an unexpected closing of two nodes that include the at least one line with the conveying means, is evaluated and recorded as a replacement of at least one of the conveying means and the line combined with the conveying means.

19. The method as claimed in claim 17, wherein a cleaning is prompted for the at least one line, and wherein an unexpected cleaning of the at least one line is evaluated and recorded as a previously performed replacement of the at least one line.

20. The method as claimed in claim 17, wherein a pressure test is prompted for the at least one line, and wherein an unexpected pressure test of the at least one line is evaluated and recorded as a previously performed replacement of the at least one line.

21. A system automatically recording an intervention in a production facility, where the production facility is controlled by a control program and has a plurality of facility components comprising:
   a central mechanism retrieving, from the control program, information on a respective status of at least one facility component and additional information relating to existence of the respective status of the at least one facility component according to the control program; and
   a log recording information regarding the respective status,
   wherein, when the respective status of the at least one facility component does not exist according to the control program, a manual intervention into the production facility is executed and the log records information about the manual intervention.

22. The method according to claim 1, wherein said executed intervention is a manual intervention.

23. The method according to claim 1, further comprising determining a component of the production facility modified during the intervention, and recording identification of the modified component into the intervention log.

24. The system according to claim 21, wherein the log records a time and date when the manual intervention was executed and a facility component of the production facility that was modified.

* * * * *